United States Patent
Morrison, III et al.

(10) Patent No.: US 9,332,087 B2
(45) Date of Patent: May 3, 2016

(54) DYNAMIC BUFFER

(71) Applicant: MICROSOFT TECHNOLOGY LICENSING, LLC, Redmond, WA (US)

(72) Inventors: Frank R. Morrison, III, Seattle, WA (US); Alexander Burba, Seattle, WA (US); Brandon Hunt, Redmond, WA (US); John Justice, Bellevue, WA (US); Krassimir Karamfilov, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 47 days.

(21) Appl. No.: 13/761,047

(22) Filed: Feb. 6, 2013

(65) Prior Publication Data

US 2014/0221084 A1    Aug. 7, 2014

(51) Int. Cl.
| | | |
|---|---|---|
| G06F 17/00 | (2006.01) |
| H04L 29/08 | (2006.01) |
| A63F 13/358 | (2014.01) |
| A63F 13/48 | (2014.01) |

(52) U.S. Cl.
CPC ............ H04L 67/32 (2013.01); A63F 13/358 (2014.09); A63F 13/48 (2014.09)

(58) Field of Classification Search
CPC .................................................. A63F 2300/552
USPC ....................................................... 463/42, 43
See application file for complete search history.

(56) References Cited

U.S. PATENT DOCUMENTS

| | | | |
|---|---|---|---|
| 7,627,632 B2 | 12/2009 | Douceur et al. | |
| 8,221,220 B2 | 7/2012 | Ackley et al. | |
| 2005/0138658 A1 | 6/2005 | Bryan | |
| 2008/0049036 A1 | 2/2008 | Chang | |
| 2008/0172441 A1 * | 7/2008 | Speicher et al. | 709/201 |
| 2009/0094600 A1 * | 4/2009 | Sargaison et al. | 717/177 |
| 2011/0106969 A1 * | 5/2011 | Choudhury et al. | 709/236 |
| 2012/0283017 A1 * | 11/2012 | Ahiska et al. | 463/40 |
| 2013/0002693 A1 | 1/2013 | Nara | |

OTHER PUBLICATIONS

Mehdi, et al., "Content Adaptation and Shared State Distribution for Multiplayer Mobile Games", Retrieved at <<http://wlv.openrepository.com/wlv/bitstream/2436/34732/2/CGAMES_06(b)_Mehdi%2520et%2520al.pdf>>, In the proceedings of International Conference on Computer Games : Artificial Intelligence and Mobile Systems, Nov. 22, 2006, pp. 6.

(Continued)

*Primary Examiner* — Dmitry Suhol
*Assistant Examiner* — Carl V Larsen
(74) *Attorney, Agent, or Firm* — Aaron Chatterjee; Judy Yee; Micky Minhas

(57) ABSTRACT

Buffering an interactive digital content item includes downloading the interactive digital content item, and beginning execution of the interactive digital content item with a buffer after enough of the interactive digital content item is downloaded to fill the buffer and before the interactive digital content item is completely downloaded. The size of the buffer is dynamically set as a function of one or more experience parameters.

20 Claims, 2 Drawing Sheets

(56) References Cited

OTHER PUBLICATIONS

Kazmi, et al., "Action Recognition for Support of Adaptive Gameplay: A Case Study of a First Person Shooter", Retrieved at <<http://downloads.hindawi.com/journals/ijcgt/2010/536480. pdf>>, In the International Journal of Computer Games Technology, vol. 2010, Jan. 2010, pp. 14.

Yu, et al., "Cross-Layer Optimization for State Update in Mobile Gaming", Retrieved at <<http://ieeexplore.ieee.org/stamp/stamp. jsp?tp=&arnumber=4563454>>, In the proceedings of IEEE Transactions on Multimedia, vol. 10, No. 5, Aug. 2008, pp. 10.

Ye, et al., "System-performance modeling for massively multiplayer online role-playing games", Retrieved at <<http://ieeexplore.ieee. org/stamp/stamp.jsp?tp=&arnumber=5386660>>, In the proceedings of IBM Systems Journal, vol. 45, No. 1, Jan. 2006, pp. 14.

Pang, et al., "Scaling Peer-to-Peer Games in Low-Bandwidth Environments", Retrieved at <<http://research.microsoft.com/pubs/72895/iptps2007.pdf>>, In the proceedings of 6th International Workshop on Peer-to-Peer Systems, Feb. 26, 2007, pp. 6.

Pantel, et al., "On the Suitability of Dead Reckoning Schemes for Games", In the proceedings of the 1st workshop on Network and system support for games, Apr. 16, 2002, pp. 6.

European Patent Office, International Search Report & Written Opinion for PCT Patent Application No. PCT/US2014/014749, Apr. 15, 2014, 10 pages.

International Preliminary Examining Authority, International Preliminary Report on Patentability Issued in Application No. PCT/US2014/014749, May 13, 2015, WIPO, 8 pages.

European Patent Office, Office Action Issued in European Patent Application No. 14708978.3, Jan. 4, 2016, Netherlands, 7 pages.

\* cited by examiner

DYNAMIC BUFFER

BACKGROUND

An interactive digital content item, such as a video game, may comprise a large amount of data that may be acquired as user(s) interact with the content before downloading is complete. However, a user interacting with the content may experience delays during play as the user reaches portions of the content that have not yet been downloaded.

SUMMARY

Embodiments are disclosed for acquiring an interactive digital content item including a plurality of content portions. One example embodiment downloads the interactive digital content item, and begins execution of the interactive digital content item with a buffer after enough of the interactive digital content item is downloaded to fill the buffer and before the interactive digital content item is completely downloaded. The size of the buffer is dynamically set as a function of one or more experience parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
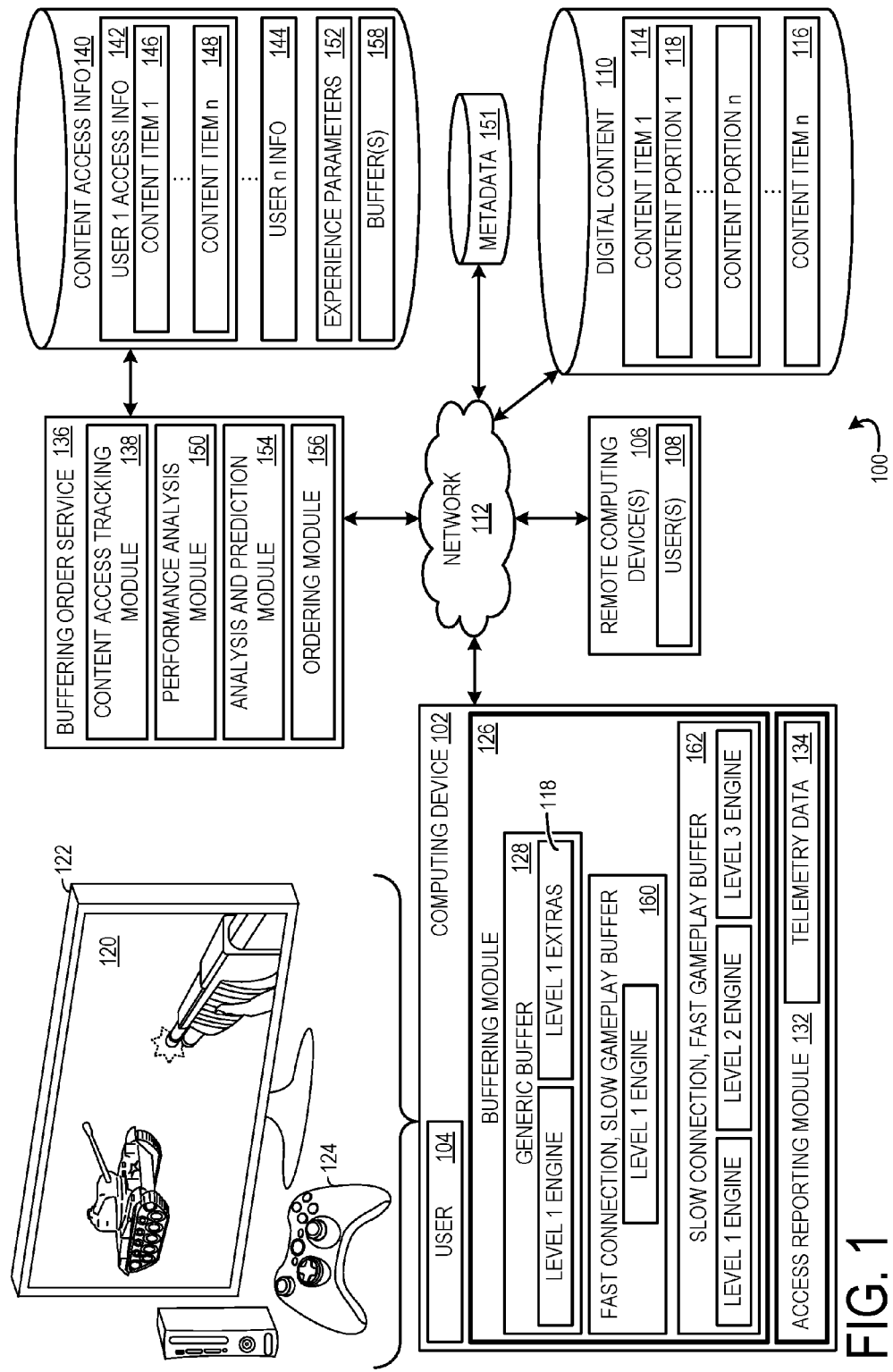
FIG. 1 illustrates an example embodiment of a digital content consumption environment.

Downloadable digital content items, such as video games, may allow a user to begin interacting with the content before downloading is complete. However, a user interacting with the content may experience interruptions (e.g. page faults) during interaction as the user reaches portions of the content that have not yet been downloaded.

When downloading a digital content item, the content item may be obtained according to a "buffering order" that defines an order in which the content portion(s) (e.g., characters, levels, music, etc.) of the content item are to be acquired by a presenting computing device (e.g., computer gaming device). Typical approaches for downloading digital content items comprise "buffering" the content portion(s) of the content item, whereby at least some of the content portion(s) are acquired ahead-of-time in order to ensure that requested content portion(s) are available without undue interruption(s). As different users may consume a particular content item differently (e.g., different game play "styles," different network bandwidth, different local computing resources, etc.), each user may experience different interruptions as the content item is consumed. For example, in the case of a video game, some users may play the game slowly and methodically while trying to solve all challenges in a level before progressing to a next level, whereas others may skip optional challenges and instead progress to higher levels as soon as possible. As another example, in the case of productivity software, some users may utilize a small subset of available features, menus, etc., whereas other users (e.g., "power users") may utilize a larger subset of features, menus, etc. Furthermore, any one or more users may experience different network throughput, therefore impacting the speed at which the content portion(s) are acquired. Generally speaking, different interruptions may arise depending upon if and/or when different users reach content portion(s) of the digital content item that have not yet been acquired.

As interactive digital content items (e.g., video games and/or other applications) may be experienced differently by each particular user, it will further be appreciated that typical approaches (e.g., buffers utilizing fixed size and/or content) may acquire unused content portion(s), thereby potentially increasing network congestion and/or otherwise providing an unsuitable experience. For example, the aforementioned user that rushes through a video game may never utilize content portion(s) providing ancillary tasks, etc. Furthermore, such typical approaches may experience unsuitable delay upon commencing access of a digital content item due to the time needed to "fill" the buffer, potentially with content portion(s) that may never be accessed. Accordingly, it will be appreciated that it may be desirable to provide an access to a digital content item as quickly as possible, and to sustain such access to the digital content item, without introducing undue interruptions to the user experience. However, it will be appreciated that such deliverables are potentially contradictory, and therefore successful buffering of a digital content item may rely upon a balance between speed of access and interruption frequency.

Embodiments are thus disclosed for dynamically varying a buffer usable to provide one or more digital content items by leveraging past and/or present access behavior (e.g., connection speed, game play style, etc.) of one or more users. Such behavior may be usable to determine what content portion(s) are to be buffered in order to ensure, for example, that a likelihood of interruption is below a desired threshold. A particular buffer may be determined, for example, based on observed bandwidth and an amount of time other users (e.g., community of users) spent accessing the digital content item. By observing access behavior for a plurality of users (e.g., "community" access behavior), a baseline buffer may be determined that may be usable to provide the desired buffering characteristics for a large portion of the users and for a large portion of available digital content items. Furthermore, access behavior for a particular user may be compared to such community access behavior, thereby allowing user-specific personalization of buffer(s) by varying the size and/or configuration of one or more buffers based on observed deviation(s) form the community access behavior.

Prior to discussing these embodiments in more detail, an example embodiment of a use environment 100 is described with reference to FIG. 1. Use environment 100 includes computing device 102 associated with user 104 and one or more remote computing devices 106, each associated with one or more other users 108, wherein each computing device 102 and 104 is configured to acquire and present digital content to the user(s). Although discussion is directed towards a single user being associated with a single computing device for ease of understanding, it will be appreciated that more than one client computing device may be associated with a user and/or more than one user may be associated with a client device (e.g., via individual user profiles, etc.) in some scenarios. As one non-limiting example, a user may have two or more of a video game console, a mobile device, a computer (laptop, desktop, tablet), a wearable device (e.g. head-mounted display), etc., and may consume digital content via each of such devices.

Each of computing devices 102 and 106 is in communication with one or more digital content stores 110 (e.g. locations from which content may be acquired) via network 112 (e.g. computer network, cellular phone network, and/or any other suitable type of network). Digital content store 110 is depicted as storing a plurality of digital content items, illustrated as digital content item 1 114 and digital content item n 116. While described in the context of a client-server environment, it will be understood that other embodiments may utilize any other suitable architecture, including, but not limited to, a peer-to-peer configuration. It will be therefore appreciated that the embodiment of FIG. 1 is provided for the purpose of example, and is not intended to be limiting in any manner.

Each digital content item comprises a plurality of content portions 118, illustrated as an arbitrary number n of digital content portions 118 of digital content item 1 114. Digital content items 114 and 116 may represent any suitable type of digital content, including, but not limited to, interactive content such as video games, productivity and/or other applications, interactive video, and social media. It will be understood that the terms "content portion" and the like denote any portion of data of a digital content item, and may or may not correspond to a discrete feature, file, object, etc. of the digital content item. Thus, content portions 118 may take any suitable form, such as, for example, portions of memory (e.g. memory locations, disk sectors, etc.) or, by extension, specific files, etc.

As illustrated, computing device 102 may be configured to download (buffer) content portion(s) 118 of a selected digital content item 120 (e.g., combat video game) from digital content store 110. In the illustrated example, computing device 102 presents selected digital content item 120 via display device 122 while receiving user input via input device 124. However, it will be appreciated that such a configuration is presented for the purpose of example, and the selected digital content item and/or computing devices providing presentation thereof may have any suitable configuration without departing from the scope of the present disclosure. For example, in some embodiments, computing device 102 may include one or more of display device 122 and input device 124 incorporated into a single housing (e.g., mobile computing device).

As mentioned above, selected digital content item 120 may be acquired according to a "baseline," or generic, buffer that may be determined, for example, based on historical access behavior of a community of users, such as user 104 and/or users 108. Computing device 102 includes buffering module 126 that may be configured to acquire selected digital content item 120 according to generic buffer 128 determined based on such community information. As generic buffer 128 may be configured, for example, to provide suitably uninterrupted content access over a plurality of conditions (e.g., varying game play styles, varying network 112 throughput, etc.), the generic buffer may include content portions 130 usable to provide such content access.

It is to be understood that the illustrated buffers are exemplary. While the buffers are illustrated at including specific content portions, the contents of a buffer can be continually updated as new content items are received into the buffer.

As illustrated, generic buffer 128 includes two content portions 118 (i.e., "level 1 engine" and "level 1 extras") usable to present a first level of selected digital content item 120. The "engine" content portion may provide a minimum amount of information (e.g., basic environment, user-controlled character, etc.) usable to provide access to the first level of the selected digital content item. Accordingly, users that speed through level 1 without excess interaction (e.g., does not experience "optional" content) may experience the first level without utilizing additional content portions 118 (e.g., "extras" content portion 118). However, as some users may be expected to experience such "optional" content, generic buffer 128 further includes "level 1 extras" content portion 118.

Although description is provided with reference to a video game, it will be appreciated that the selected digital content, and thus buffer(s) usable to provide the selected digital content, may have other configurations. For example, the selected digital content item may comprise a productivity application (e.g., word processing, publishing, editing, etc.), and it may be determined that typical accesses of such a digital content item include requests for a subset of menus, features, etc. Accordingly, generic buffer 128 may include such typical components, with other menus, features, etc. being buffered upon determination that such components are likely to be requested (e.g., determination of a "power" user, etc.). It will be understood that the configuration of content portions 118 in generic buffer 128 is presented for the purpose of example, and a particular buffer may include any one or more content portions without departing from the scope of the present disclosure.

Furthermore, although generic buffer 128 is illustrated as residing within buffering module 126, it will be appreciated that such a configuration is presented for the ease of understanding, and that selected digital content item 120 may be presented via computing device 102 according to buffer(s) utilized by various entities of use environment 100. For example, in some embodiments, the selected digital content item may be provided to a requesting computing device by a particular remote entity (e.g., service, computing device, etc.) according to buffer(s) managed by the remote entity. In other words, buffering module 126 may be configured to receive content portion(s) 118 according to a particular buffering order without buffering module 126 being aware of such buffering orders.

Continuing with the illustrated example, it will be appreciated that generic buffer 128 may not provide a suitable user experience during one or more accesses of selected digital content item 120 by user 104 via computing device 102. For example, user 104 may not experience optional content, and therefore "level 1 extras" content portion 118 may represent data that is likely never utilized by computing device 102 to present selected digital content item 120 to user 104. By acquiring unused content portion(s), computing device 102 may not begin execution of the digital content item as fast as would be possible if those items were not included in the buffer.

Accordingly, as mentioned above, it may be desirable to leverage current and/or historical access behavior to dynamically vary buffering of the selected digital content item. Thus, computing device 102 may further include access reporting module 132 configured to provide telemetry data 134 to buffering order service 136. In other embodiments, additional and/or different computing devices, and/or module(s) thereof, may be configured to acquire telemetry data 134 regarding computing device 102. Furthermore, although not illustrated for remote computing device(s) 106, it will be appreciated that such devices may include access reporting module and/or other mechanism(s) usable to provide telemetry data and/or other information.

Buffering order service 136 includes content access tracking module 138 configured to receive and track content access information (e.g., telemetry data 134 and/or other access information) for one or more digital content items (e.g., selected digital content item 120). The content access information may include, for example, information describing an order in which various content portions 118 were accessed, times at which the different content portions were accessed, and/or other information describing consumption of the digital content item(s).

As illustrated, buffering order service 136 may be communicatively coupled to content access information store 140 configured to store content access information for a plurality of users, illustrated as user 1 information 142 and user n information 144; such user-specific information may comprise access information for each digital content item accessed by the user. For example, as illustrated, user 1 access information 146 includes content item 1 access information 146 and content item n access information 148. Although illustrated as being stored on a user-by-user basis, it will be appreciated that the content access information may be stored according to any suitable mechanism, granularity, etc. without departing from the scope of the present disclosure. For example, as mentioned above, it may be desirable to leverage "community" content access information comprising access information for a plurality of users, as such content access information may elucidate common access behavior usable to potentially provide improved content buffering.

The content access information may be obtained by the buffering order service 136 from various client computing devices as users of the computing devices consume digital content items via the devices. In some embodiments, the content access information may be obtained by the buffering order service so as not to interfere with acquisition (e.g., via digital content store 110) of the digital content item by the client devices, such as by providing the content access information during detected periods of inactivity, predicted periods of inactivity, etc. Further, in some embodiments, the buffering order service may be included with a digital provision service (e.g., digital content store 110), and thus may monitor content access patterns as content is downloaded from the digital provision service.

In some embodiments, descriptive metadata may exist for content items and/or portion(s) 118 thereof, and such metadata may be used to provide an understanding of the nature of the content portions being accessed. In other words, metadata may be usable to provide "context" (e.g., what level(s) and/or experiences are being accessed) to the observed content access information. Accordingly, environment 100 further includes metadata 151 accessible via network 112. Although illustrated as metadata 151 located remotely from digital content store 110, it will be understood that metadata 151 may be stored in any suitable location, including with the corresponding content item(s) in some embodiments. Metadata may comprise, in the case of a video game, information regarding an identity of one or more virtual objects (e.g. character/object identification, location/setting, etc.) represented (partially or fully) by a particular content portion 118, for example. In some embodiments, metadata 151 also may comprise information regarding a particular digital content item as a whole (e.g. genre) and/or any other suitable information.

As mentioned above, it will be appreciated that the ability to provide a digital content item without experiencing undue interruption may rely upon the ability of the content item to be delivered to the accessing computing device. Thus, buffering order service 136 may further include, or otherwise be in communication with, performance analysis module 150 configured to obtain (e.g., via measurement and/or calculation) telemetry data related to the performance of the accessing computing device(s) (e.g., processor load, etc.), the performance of digital content store 110 (e.g., simultaneous users, storage subsystem bandwidth, etc.), the performance of any one or more interconnecting mechanisms (e.g., bandwidth of network 112), and/or any other suitable information regarding network and/or device-related factors that may impact consumption of the digital content item. Such data may be provided by and/or acquired from, for example, telemetry data 134, and may be stored with the user-specific content access information of content access information store 140.

Using the collected content access information and/or metadata 151, buffering order service 136 may be configured to determine one or more experience parameters 152 (e.g., metrics) describing observed access behavior. Parameters 152 may include, but are not limited to, a current rate at which selected interactive digital content item 120 is downloaded, a historical rate at which one or more digital content items (e.g., selected digital content item 120 and/or other digital content item(s)) have previously been downloaded, and/or a content item-specific, speed-of-access metric indicating an average speed at which other users have previously accessed (e.g., played-through) the interactive digital content item. In other words, experience parameters 152 may include content-specific parameter(s) and/or parameters determined from content access information for a plurality of digital content items. It will be appreciated that the term "average speed" and the like may refer to various rate-based metrics, and may include, but are not limited to, average speed over one or more defined periods, a range of observed speeds over one or more defined periods, and/or any other suitable metric indicating consumption rate(s).

Instead of, or in addition to, parameter(s) 152 being associated with one or more digital content items, parameter(s) 152 may include parameter(s) associated with any one or more users in some embodiments. As one non-limiting example, parameters 152 may include a user-specific, speed-of-access metric indicating a relative speed at which a current user (e.g., user 104) has previously accessed any one or more digital content items. For example, in video game scenarios, such a metric may describe a "speed-of-play" describing rate(s) by which the user (i.e., player) previously played through one or more video games. As mentioned above, some users may access content portions 118 at different rates due to varying game play styles, etc., and therefore such a speed-of-play/speed-of-access metric may be usable to provide insight into such behaviors, thereby potentially enabling more intelligent buffering of the digital content items. As one non-limiting example, users associated with a slower speed-of-access metric may utilize a smaller buffer without experiencing increased interruption, as compared to users associated with a faster speed-of-access metric.

Once suitable information is available to buffering order service 136, the buffering order service may utilize such information to anticipate characteristic(s) of future content access(es) in order to, for example, determine buffer(s) by which such future accesses are to be provided. Thus, buffering order service 136 further includes analysis and prediction module 154 configured to analyze the content access information, experience parameters 152, and/or other information (e.g., metadata 151) in order to predict future consumption behaviors of digital content items. In some embodiments, additional information may be considered. For example, temporal factor(s), such as time of day, day of week, etc. may be usable to improve the buffer(s), as various considerations (e.g., network 112 throughput), may vary based on such factor(s).

By analyzing such various information, buffering order service 136 may be able to determine a likelihood of interruption to future consumption of various digital content items, and may therefore determine which content portion(s) of the digital content item are provided to one or more computing devices associated with any one or more users. Analysis and prediction module 154 may be configured to analyze any suitable content access information and/or parameters 152 to provide such predictions, such as, for example, content access information for a single digital content item, for a family of titles, for a selected genre/type of content, for multiple titles of different genres/types, and/or for any one or more digital content items.

Information provided by analysis and prediction module 154 and performance analysis module 150 may be used by buffer ordering module 156 to determine and/or refine buffer(s) to provide a suitably uninterrupted experience of the one or more digital content items. As mentioned above, an order and rate at which a user accesses portions 118 of a digital content item may depend upon user-specific behavior(s) (e.g., how much time taken to navigate through a particular level of a video game) and a rate at which the content portions can be delivered to the client (e.g., due to network 112 bandwidth, available computing device resources, etc.). In some embodiments, a buffer may be determined that is usable to provide a substantially uninterrupted experience (e.g., below a threshold interruption frequency and/or below a threshold amount of interruptions) over a prospective access period (e.g., one hour). For example, if a particular user has been observed to experience digital content items in discrete one-hour "sessions," a digital content item may be provided according to a buffer configured to provide a suitably uninterrupted experience for at least one hour. In some embodiments, such an interruption threshold and/or prospective access period may be standardized across a particular content service, computing device, etc.

As illustrated, buffer(s) 158 determined by the buffering order service may be stored via content access information store 140 for future use and/or refinement. However, it will be understood that such information may be stored in any suitable location, such as, for example, one or more storage machines of the requesting computing devices. For example, as mentioned above, it will be appreciated that the determined buffer(s) may be provided to the client computing device(s) such that the device(s) acquire content portion(s) from digital content store 110 according to the buffer(s) in some embodiments. In other embodiments, the buffer(s) may be directly usable by digital content store 110 and/or services configured to use content from digital content store 110 such that content portion(s) 118 are delivered to the requesting computing device(s) without directly providing the buffering order(s) to the requesting computing device(s).

It will be appreciated that regardless of the configuration of the one or more buffers 158 determined by buffering order service 136, such buffers may further be dynamically varied in size and/or content according to observed behavior. Continuing with the illustrated example of FIG. 1, during access of selected digital content item 120 via computing device 102, the computing device may be configured to monitor and send, and/or buffering order service 136 may be configured to request, content access information describing how the digital content item is consumed via the computing device. The content access information may be sent from the client device at periodic and/or non-period intervals (e.g., every 5 minutes, every day at midnight, during periods of low activity, etc.). As a more specific example, the content access information may be provided to the buffering order service upon detecting inactivity at the client device (e.g., during the middle of the night), so as to reduce network bandwidth used at any particular time, for example. In other embodiments, the computing device may be configured to programmatically provide the content access information, whereas the service may be configured to request the content access information in other embodiments.

As content access information is received from the client device, buffering order service 136 may refine the one or more buffers 158 (e.g., generic buffer 128) based on such information. As one non-limiting example, some content access requests made by the computing device during consumption (e.g. requests for content portion(s) not identified by generic buffer 128) may correspond to requests for content portions due to page faults. As another example, some requests may include requests for content portion(s) 118 identified by generic buffer 128 that have not yet been acquired due to, for example, unsuitable network 112 bandwidth.

Based on observed access behavior, buffering order service 136 may be configured to refine generic buffer 128 and/or to create one or more other buffers (e.g., buffers 160 and 162) in order to provide an improved user experience (e.g., decreased interruption frequency). More specifically, as mentioned above, buffering order service 136 may be configured to recognize deviations between presently observed access information and observed "community" access behavior, as such deviations may enable understanding of whether or not generic buffer 128 is suitable to field specific access requests.

As illustrated, buffer 160 may potentially provide an improved user experience for user(s) experiencing a fast connection (e.g., increased network 112 throughput) and a slow game play style. Specifically, buffer 160 may include fewer content portions 118 as compared to generic buffer 128, and may only include "level 1 engine" content portion 118. In other words, buffer 160 may not include ancillary information for level 1, as such information may be infrequently accessed due to the user's game play style, and such information may nonetheless be acquired substantially on-demand due to the fast connection. As such, buffer 160 may have a decreased buffer size compared to the generic buffer, as illustrated by relative widths of buffers 128 and 160.

In contrast, buffer 162 may potentially provide an improved user experience for user(s) experiencing a slow connection and a fast game play style. Buffer 162 includes a greater amount of content portion(s) 118 than generic buffer 162, such as information for future levels (e.g., "level 2 engine" and "level 3 engine" content portions 118), as it may be determined that such user(s) are likely to access future levels (e.g., levels 2 and/or 3) within a period of time that necessitates the acquisition of associated content portions substantially ahead-of-time (e.g., due to a slow connection). Buffer 162 may further lack at least some content portions 118 of generic buffer 128 (e.g., "level 1 extras" content portion 118), as such content portions may be expected to not be accessed based on observed game play style. Accordingly, as illustrated by relative widths of buffers 128 and 162, buffer 162 may have an increased buffer size compared to the generic buffer.

It will be appreciated that buffers 128, 160, and 162 are presented for the purpose of example, and any one or more characteristics (e.g., size, content, etc.) of any one or more buffers may be varied based on observed access information in order to, for example, provide one or more digital content item(s) with decreased interruption frequency. As described above, it will be further appreciated that such buffers may be determined by, provided to, and used by any one or more computing devices without departing from the scope of the present disclosure, and is therefore not limited to buffer(s) used by buffering module 126 of computing device 102 to acquire the identified content portion(s).

Upon refining and/or creating a particular buffer, client device 102 may acquire, and/or may be provided with, a digital content item according to the updated buffering order. The content item continues to be acquired via the computing device 102 until an entirety of the digital content item is acquired, with user 104 and/or users 108 potentially consuming the digital content item via one or more sessions during such acquisition. It will be understood that although a single instance of updating buffer(s) has been described, further updates may be provided as user 104 interacts with selected digital content item 120 and/or other digital content items without departing from the scope of the present disclosure.

Figure 2:
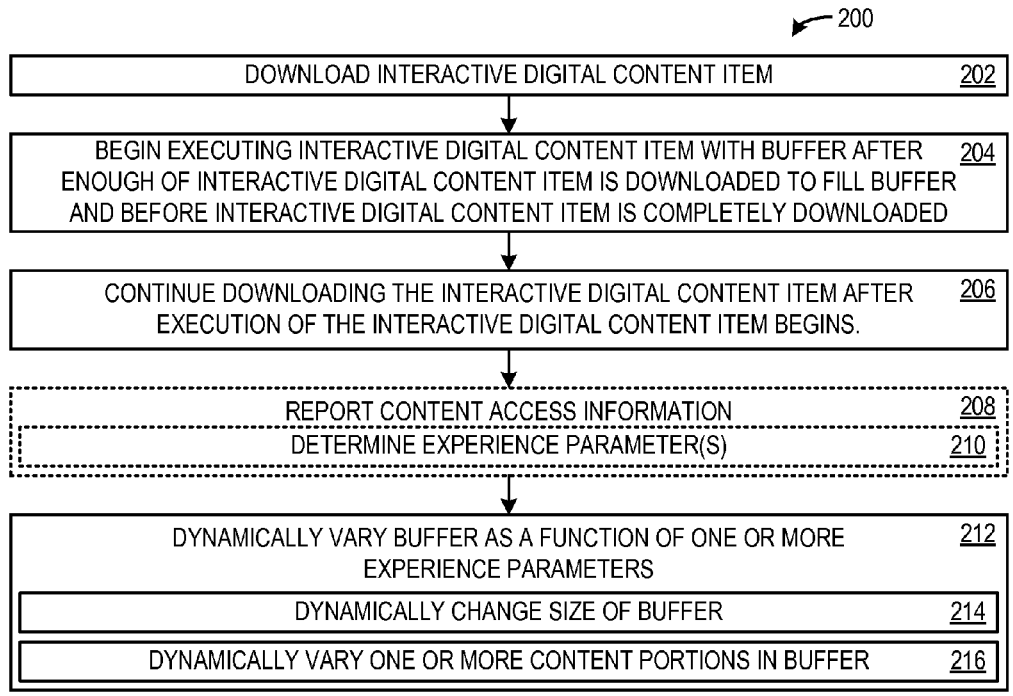
FIG. 2 schematically illustrates an example of a method for acquiring a digital content item according to an embodiment of the present disclosure.

FIG. 2 illustrates an example method 200 for acquiring a digital content item according to an embodiment of the present disclosure. At 202, method 200 comprises downloading an interactive digital content item (e.g., video game, productivity and/or other application, etc.). It will be appreciated that reference to an interactive digital content item is intended to be non-limiting, and method 200 may apply to downloading of any suitable digital content item(s).

Regardless of the configuration of the content, digital content may be acquired from one or more content stores (e.g., digital content store 110) and/or from one or more other entities (e.g., remote computing devices 106 via peer-to-peer connection(s), etc.) according to a particular buffer identifying one or more content portions. The buffer may be determined from presently-observed information, from previously-observed information, and/or may be provided by various other mechanisms (e.g., developer-defined buffer, service-defined buffer, etc.).

As mentioned above, it may be desirable to decrease an amount of time needed to first begin interacting with a particular digital content item, and therefore the digital content item may continue to be acquired while the content item is consumed (e.g., interacted with) by the user(s). Accordingly, at 204, method 200 further comprises beginning execution of the interactive digital content item with a buffer after enough of the interactive digital content item is downloaded to fill the buffer and before the interactive digital content item is completely downloaded. In this way, execution will not begin without sufficient content portion(s) received.

Method 200 further comprises, at 206, continuing downloading of the interactive digital content item after execution of the interactive digital content item begins. In this way, consumption of the digital content item may be provided while additional content portion(s) are downloaded. By allowing a user to begin experiencing the digital content item before it is fully downloaded, the time between when a user decides to acquire a content item and is able to begin experiencing the content item is decreased. Such a decrease in this experience time may potentially decrease a barrier of entry to the digital content item and increase a probability that the digital content item will be experienced.

As described above, it may be desirable to ensure that content portion(s) are available when requested by a requesting client computing device, and such a feature may be provided by analyzing observed access behavior in order to predict future content consumption so as to, for example, decrease a likelihood of future interruption(s). Thus, method 200 may optionally comprise reporting 208 content access information (e.g., telemetry data 134, etc.). Even if reporting is not provided by a particular computing device, observed information for one or more other users and/or devices may still be utilized to refine buffer(s) utilized by the computing device in some scenarios. At 210, method 200 may include determining one or more experience parameters (e.g., experience parameters 152). As one non-limiting example, the reported content access information may include speed-of-access information usable to determine one or more content item-specific, speed-of-access experience parameters.

At 212, method 200 further comprises dynamically varying the buffer as a function of one or more experience parameters. Dynamically varying the buffer may include, for example, dynamically changing 214 a size of the buffer (e.g., number of content portion(s)) as a function of one or more experience parameters. In some embodiments, the size of the buffer may be dynamically set so as to provide access to the interactive digital content item for at least a threshold time duration with at most a threshold probability of interruption (e.g., interruption rate, absolute number of interruptions, etc.) due to exhausting the buffer. For example, as mentioned above, the size of the buffer may be set to provide one hour of substantially uninterrupted game play if the user has been observed to typically access digital content item(s) via a plurality of one-hour "sessions."

Generally speaking, the size of the buffer may be varied according to any one or more function(s) based on any one or more experience parameter(s). As one non-limiting example, the size of the buffer may be inversely proportional to a current rate at which the interactive digital content item is downloaded. In other words, if it is observed that a particular requesting device is able to acquire content portion(s) with increased speed, a relatively smaller buffer may be used.

As another example, the size of the buffer may be inversely proportional to a historical rate at which interactive digital content items have previously been downloaded. In other words, if previously-observed historical information indicates that the digital content item(s) have been acquired via a fast connection, the size of the buffer may be decreased.

Just as the speed by which the content portion(s) are able to be acquired may impact the buffer, so too may the behavior (e.g., game play style) of the community and/or the requesting user(s). As an example, the size of the buffer may be proportional to the average speed at which other users have previously accessed the interactive digital content item. In other words, a relatively larger buffer may be used if other users have been observed to access more data at a faster rate.

As another example, the size of the buffer may be proportional to the relative speed at which the current user has previously accessed other interactive digital content items. In other words, if the interactive digital content item(s) have been observed to be accessed in a slow, tedious manner, the size of the buffer may be decreased. In contrast, if the interactive digital content item(s) have been observed to be accessed in a fast and/or unpredictable manner, the size of the buffer may be increased to increase a likelihood that a requested content item is present in the buffer when needed.

It will be appreciated that, in some embodiments, it may be desirable to dynamically vary the buffer by varying 216 one or more content portions in the buffer instead of, or in addition to, varying the size of the buffer. For example, upon observing content access behavior that substantially deviates from the historical behavior on which the buffer is based, it may be desirable to vary the content portion(s) in order to better anticipate the actual observed behavior.

Generally speaking, the buffer may be varied by increasing the amount of information contained within the buffer and/or by modifying the order that information is added to the buffer.

In some embodiments, the methods and processes described above may be tied to a computing system of one or more computing devices. In particular, such methods and processes may be implemented as a computer-application program or service, an application-programming interface (API), a library, and/or other computer-program product.

Figure 3:
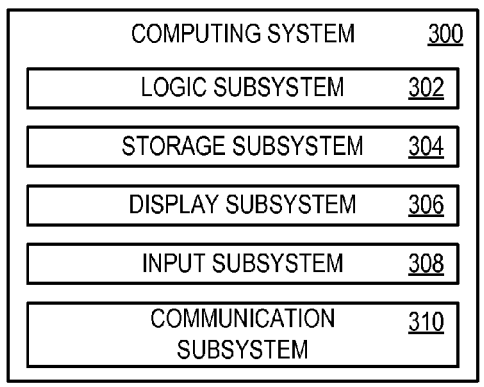
FIG. 3 illustrates an example embodiment of a computing system.

FIG. 3 schematically shows a non-limiting embodiment of a computing system 300 that can enact one or more of the methods and processes described above. Computing system 300 is shown in simplified form, and non-limiting examples of computing system 300 include computing device 102, remote computing device(s) 106 and buffering order service 136. It will be understood that virtually any computer architecture may be used without departing from the scope of this disclosure. In different embodiments, computing system 300 may take the form of a mainframe computer, server computer, desktop computer, laptop computer, tablet computer, home-entertainment computer, network computing device, gaming device, mobile computing device, mobile communication device (e.g., smart phone), etc.

Computing system 300 includes a logic subsystem 302 and a storage subsystem 304. Computing system 300 may optionally include a display subsystem 306, input subsystem 308, communication subsystem 310, and/or other components not shown in FIG. 3.

Logic subsystem 302 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 304 includes one or more physical devices configured to hold data and/or instructions executable by the logic subsystem to implement the methods and processes described herein. When such methods and processes are implemented, the state of storage subsystem 304 may be transformed—e.g., to hold different data.

Storage subsystem 304 may include removable media and/or built-in devices. Storage subsystem 304 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 304 may include volatile, nonvolatile, dynamic, static, read/write, read-only, random-access, sequential-access, location-addressable, file-addressable, and/or content-addressable devices.

It will be appreciated that storage subsystem 304 includes one or more physical devices. However, in some embodiments, aspects of the instructions described herein may be propagated in a transitory fashion by a pure signal (e.g., an electromagnetic signal, an optical signal, etc.) that is not held by a physical device for a finite duration. Furthermore, data and/or other forms of information pertaining to the present disclosure may be propagated by a pure signal.

In some embodiments, aspects of logic subsystem 302 and of storage subsystem 304 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 306 may be used to present a visual representation of data held by storage subsystem 304. This visual representation may take the form of a graphical user interface (GUI). As the herein described methods and processes change the data held by the storage subsystem, and thus transform the state of the storage subsystem, the state of display subsystem 306 may likewise be transformed to visually represent changes in the underlying data. Display subsystem 306 may include one or more display devices utilizing virtually any type of technology. Such display devices may be combined with logic subsystem 302 and/or storage subsystem 304 in a shared enclosure, or such display devices may be peripheral display devices.

When included, input subsystem 308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 310 may be configured to communicatively couple computing system 300 with one or more other computing devices. Communication subsystem 310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
   a logic machine; and
   a storage machine holding instructions executable by the logic machine to:
   download an interactive digital content item; and
   begin executing the interactive digital content item with a buffer after enough of the interactive digital content item is downloaded to fill the buffer and before the interactive digital content item is completely downloaded, a size of the buffer dynamically set as a function of one or both of a user-specific speed-of-access metric indicating a relative speed at which a current user has previously accessed other interactive digital content items during content execution, and a content item-specific speed-of-access metric indicating an average speed at which other users have previously accessed the interactive digital content item during content execution.

2. The computing device of claim 1, where the size if the buffer dynamically set as a function of a content download speed metric indicating a current rate at which the interactive digital content item is downloaded.

3. The computing device of claim 2, where the size of the buffer is inversely proportional to the current rate at which the interactive digital content item is downloaded.

4. The computing device of claim 2, where the content download speed metric further indicates a historical rate at which one or more digital content items have previously been downloaded.

5. The computing device of claim 4, where the size of the buffer is inversely proportional to the historical rate at which interactive digital content items have previously been downloaded.

6. The computing device of claim 2, the instructions being further executable to dynamically change the size of the buffer responsive to a chance in one or more of the user-specific speed-of-access metric, the content item-specific speed-of-access metric, and the content download speed metric.

7. The computing device of claim 2, the instructions being further executable to dynamically vary one or more content portions of the interactive digital content item in the buffer as a function of one or more of the content download speed metric, the user-specific speed-of-access metric, and the content item-specific speed-of-access metric.

8. The computing device of claim 1, where the interactive digital content item is a game, and where the user-specific speed-of-access metric indicates a relative speed at which a current user has previously accessed other games.

9. The computing device of claim 8, where the size of the buffer is proportional to the relative speed at which the current user has previously accessed the other names.

10. The computing device of claim 1, where the interactive digital content item is a name, and where the content item-specific speed-of-access metric indicates an average speed at which other users have previously accessed the game.

11. The computing device of claim 10, where the size of the buffer is proportional to the average speed at which other users have previously accessed the game.

12. The computing device of claim 10, where the content item-specific, speed-of-access metric is calculated from telemetry data.

13. The computing device of claim 10, the instructions being further executable to report speed-of-access information for inclusion in content item-specific, speed-of-access metric calculations.

14. The computing device of claim 1, the instructions being further executable to continue downloading the interactive digital content item after execution of the interactive digital content item begins.

15. The computing device of claim 1, where the size of the buffer is dynamically set so as to provide access to the interactive digital content item for at least a threshold time duration with at most a threshold probability of interruption due to exhausting the buffer.

16. A method, comprising:
    downloading a game to a storage machine; and
    begin executing the game via a logic machine with a buffer after enough of the game is downloaded to fill the buffer and before the game is completely downloaded, a size of the buffer dynamically set as a function of one or both of a player-specific speed-of-play metric and a game-specific speed-of-play metric, the player-specific speed of play metric indicating a relative speed at which a current player has previously played through games, and the game-specific speed-of-play metric indicating an average speed at which other players have previously played through the game.

17. The method of claim 16, where the size of the buffer is further dynamically set as a function of a game download speed metric indicating a current rate at which the game is downloaded, and a historical rate at which one or more other games have previously been downloaded.

18. The method of claim 16, where the size of the buffer is proportional to the relative speed at which the current user has previously played through other games.

19. The method of claim 16, where the size of the buffer is proportional to the average speed at which other users have previously played through the game.

20. A computer gaming device, comprising:
    a logic machine; and
    a storage machine holding instructions executable by the logic machine to:
    download a game;
    begin executing the game with a buffer after enough of the game is downloaded to fill the buffer and before the game is completely downloaded, a size of the buffer dynamically set in inverse proportion to a current rate at which the game is downloaded, in inverse proportion to a historical rate at which content has previously been downloaded, in proportion to a player-specific, speed-of-play metric indicating a relative speed at which a current game player has previously played through games, and in proportion to a game-specific, speed-of-play metric indicating an average speed at which other game players have previously played through the game.

* * * * *